US008591026B2

(12) United States Patent
Conte et al.

(10) Patent No.: US 8,591,026 B2
(45) Date of Patent: Nov. 26, 2013

(54) OPTICAL ARTICLE COATED WITH AN ANTIREFLECTION OR REFLECTIVE COATING COMPRISING AN ELECTRICALLY CONDUCTIVE FILM BASED ON TIN OXIDE, AND PRODUCTION METHOD

(75) Inventors: Dominique Conte, Charenton le Pont (FR); Delphine Passard, Charenton le Pont (FR); Karin Scherer, Charenton le Pont (FR); Jean-Louis Sirjean, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 13/260,695

(22) PCT Filed: Mar. 26, 2010

(86) PCT No.: PCT/FR2010/050564
§ 371 (c)(1),
(2), (4) Date: Sep. 27, 2011

(87) PCT Pub. No.: WO2010/109154
PCT Pub. Date: Sep. 30, 2010

(65) Prior Publication Data
US 2012/0013845 A1  Jan. 19, 2012

(30) Foreign Application Priority Data
Mar. 27, 2009 (FR) .................... 09 01475

(51) Int. Cl.
*G02C 7/00* (2006.01)
*G02C 7/10* (2006.01)
(52) U.S. Cl.
CPC . *G02C 7/104* (2013.01); *G02C 7/00* (2013.01)
USPC ....... 351/159.57; 351/139; 359/359; 359/360
(58) Field of Classification Search
USPC ........ 600/176; 252/520.1; 359/665, 359, 360; 351/139, 159.57
See application file for complete search history.

(56) References Cited

U.S. PATENT DOCUMENTS

| 5,268,787 | A | 12/1993 | McIntyre | 359/347 |
|---|---|---|---|---|
| 6,852,406 | B2 * | 2/2005 | Marechal et al. | 428/336 |
| 2002/0018887 | A1 | 2/2002 | Sumida et al. | 428/331 |
| 2004/0156110 | A1 | 8/2004 | Ikeyama | 359/603 |
| 2005/0064152 | A1 | 3/2005 | Aylward et al. | 428/195.1 |
| 2006/0017011 | A1 | 1/2006 | Shang | 250/492.1 |
| 2006/0175585 | A1 * | 8/2006 | Drotleff et al. | 252/582 |
| 2007/0166522 | A1 | 7/2007 | Beinat et al. | 428/212 |
| 2008/0028984 | A1 | 2/2008 | Meredith et al. | 106/287.17 |
| 2008/0213473 | A1 | 9/2008 | Roisin et al. | 427/162 |

FOREIGN PATENT DOCUMENTS

| DE | 39 42 990 | 6/1991 |
|---|---|---|
| DE | 41 17 257 | 12/1992 |
| EP | 0 834 092 | 4/1998 |
| FR | 2 913 116 | 8/2008 |
| FR | 2 917 510 | 12/2008 |
| WO | WO 2009/004222 | 1/2009 |

OTHER PUBLICATIONS

PCT International Search Report issued in International Application No. PCT/FR2010/050564, dated Jul. 5, 2010.

* cited by examiner

*Primary Examiner* — Scott J Sugarman
*Assistant Examiner* — William Alexander
(74) *Attorney, Agent, or Firm* — Fulbright & Jaworski LLP

(57) ABSTRACT

This invention relates to an optical article having antistatic and antireflection or reflective properties, comprising a substrate having at least one main surface coated with an antireflection or reflective coating, said coating comprising at least one electrically conductive layer comprising at least 30% tin oxide ($SnO_2$) by weight relative to the total weight of the electrically conductive layer, said electrically conductive layer having been deposited by ion-assisted deposition, and said substrate having a water uptake rate equal to or greater than 0.6% by weight relative to the total weight of said substrate, the water uptake rate being measured after predrying said substrate and then storing it for 800 hours in a chamber at 50° C. under 100% relative humidity and at atmospheric pressure.

20 Claims, No Drawings

OPTICAL ARTICLE COATED WITH AN ANTIREFLECTION OR REFLECTIVE COATING COMPRISING AN ELECTRICALLY CONDUCTIVE FILM BASED ON TIN OXIDE, AND PRODUCTION METHOD

This application is a national phase application under 35 U.S.C. §371 of International Application No. PCT/ FR2010/ 050564 filed 26 Mar. 2010, which claims priority to French Application No. 0901475 filed on 27 Mar. 2009. The entire text of each of the above-referenced disclosures is specifically incorporated herein by reference without disclaimer.

The present invention generally relates to an optical article, especially an ophthalmic lens, having both antistatic and antireflection or reflective properties, which advantageously does not develop cosmetic defects over time as a result of the antistatic treatment it was submitted to, as well as to a method for making such an optical article.

It is known to protect the surfaces of ophthalmic glasses, whether they are mineral or organic ones, by means of hard coatings (abrasion-resistant and/or scratch-resistant coatings) which are typically based on a polysiloxane. It is also known to treat ophthalmic lenses so as to prevent any stray or unwanted reflected light from appearing, what would disturb the lens wearer and the persons he or she is talking to. The lens is then provided with a mono- or a multilayered antireflective coating, generally made of a mineral material.

When the lens comprises within its structure a hard abrasion-resistant coating, the antireflective coating is generally deposited onto the abrasion-resistant layer surface. Such a stack reduces the impact strength, by rigidifying the system then becoming brittle. This problem is well known in the industry of ophthalmic lenses made of organic glass.

To counteract such a drawback, it has been suggested to provide an impact-resistant primer layer between the lens in organic glass and the abrasion-resistant hard coating.

It is also well known that optical articles made of substantially insulating materials tend to have their surface becoming easily charged with static electricity, particularly when cleaned under dry conditions by rubbing their surface with a wiping cloth, a piece of synthetic foam or of polyester (triboelectricity). Charges present on the surface thereof do create an electrostatic field able of attracting and retaining objects with a very low weight standing in the vicinity (a few centimeters away therefrom), generally very small sized-particles such as dust, and for all the time the charge remains effective on the article.

In order to reduce or to inhibit the particle attraction, it is necessary to reduce the electrostatic field intensity, that is to say to reduce the number of static charges present on the article surface. This may be done by making the charges mobile, for example by inserting a layer of a material inducing a strong mobility of the "charge carriers". The materials inducing the strongest mobility are the so called conducting materials. Thus, a high-conductivity material makes it possible to more rapidly dissipate the charges.

The state of the art reveals that an optical article may be given antistatic properties by incorporating into the surface thereof, in the functional coating stack, at least one electroconductive layer, or "antistatic layer", both expressions being used indifferently.

Such an antistatic layer may form the outer layer of the functional coating stack, or an intermediate layer (inner layer), or may be directly deposited onto the optical article substrate. Incorporating such a layer into a stack provides the article with antistatic properties, even if the antistatic coating is inserted between two not antistatic coatings or substrates.

As used herein, "antistatic" is intended to mean the ability not to retain and/or develop a substantial electrostatic charge. An article is generally considered as having acceptable antistatic properties, when neither attracting nor retaining dust and small particles after one surface thereof has been rubbed using a suitable wiping cloth. It is able to rapidly dissipate the accumulated electrostatic charges, so that such an article seems to be cleaner after having been wiped.

Various methods for quantifying the antistatic properties of a material may be used.

The antistatic property of a material is frequently associated with the static potential of the same. When the static potential of the material (measured when the article has not been charged) is of 0 KV +/−0.1 KV (absolute value), the material is considered as being antistatic, on the other hand when its static potential is different from 0 KV +/−0.1 KV (absolute value), the material is considered as being static.

According to another method, the ability for a glass to drain a static charge off that was obtained by rubbing with a cloth or by any other means suitable for creating an electrostatic charge (a corona charge for instance) may be quantified by measuring the dissipation time of said charge. Thus, in the present application, a glass is considered as being antistatic if its discharge time is equal to or lower than 500 milliseconds. Static glasses may possess discharge times of several dozens of seconds and when they have been just wiped may attract surrounding dust during all the time required for their charge to be drained off.

The known antistatic coatings comprise at least one antistatic agent, which is generally a metal oxide (semi)conductor optionally doped, such as indium-tin oxide (ITO), zinc oxide.

Indium-tin oxide (ITO) is the most popular material. It may be indium-doped tin oxide or tin-doped indium oxide. The most commonly used material is typically tin-doped indium oxide, tin being used in an amount of from 5 to 17% by weight.

The applications or patents EP 0834092, DE 3942990, DE 4117257, U.S. Pat. No. 6,852,406, US 2008/028984 and US 2002/018887 disclose optical articles, especially ophthalmic lenses, provided with an antireflection stack that is mineral in nature comprising a mineral, transparent electrically conductive layer that has been deposited under vacuum, based on titanium dioxide, indium-tin oxide (ITO), zinc oxide, tin oxide, etc. The ITO layer described in the patent U.S. Pat. No. 6,852,406 has been generally formed from a source comprising 90% indium oxide and 10% tin oxide.

The patent WO 2009/004222, in the name of the applicant, discloses an optical article with antireflection properties, comprising a substrate having at least one main surface coated with an antireflection coating which may comprise at least one electrically conductive layer. This layer preferably comprises a metal oxide selected from indium, tin, zinc oxides and their combinations, the preferred material being indium-tin oxide (ITO).

However, antireflection coatings comprising an ITO-based antistatic layer do not reveal fully satisfying.

ITO-based antistatic layers as a drawback suffer from absorbing in the visible range in a not negligible way, so that their thickness must be relatively low not to be detrimental to the transparency properties of the optical article. Thus, ITO layers have a slightly excessive yellow level when deposited onto some substrates such as the ORMA® substrate, which is perceptible to the naked eye if the ITO layer thickness exceeds 6.5 nm.

But the main disadvantage of using such conductive antistatic layers, in particular ITO layers, lies in the occurrence on the optical article of defects that are called cosmetic defects after a relatively short period of time after having provided the optical article with antireflection and antistatic properties. Such defects are an obstacle to the marketing of the optical articles in question. Depending on the substrates, these defects either are present initially or do gradually appear sometime after, within a period of a few days to several months, during the use of ophthalmic lenses. Such defects come as points or lines on the article surface.

Conductive layers are typically deposited by ion-assisted deposition. The inventors have determined that such ion-assisted deposition significantly reduces the defect occurrence rate.

The problematic occurrence of cosmetic defects has not been debated in either of the hereabove mentioned documents.

It is therefore an object of the present invention to provide a transparent optical article, especially an ophthalmic lens, having both antistatic and antireflection or reflective properties, optionally abrasion-resistant and/or scratch-resistant properties and/or impact-resistant properties, but which does not develop cosmetic defects over time, and retains outstanding adhesion properties between the various layers of the coating.

It is another object of the present invention to provide an optical article the antistatic properties of which are stable over time.

It is a further object of the present invention to provide a method for making an article as defined hereabove which can be easily integrated to the traditional process for making such articles while avoiding any substrate heating step.

The inventors have determined that it was relevant to act on the nature of the material forming the antistatic layer and to choose a specific material to solve the technical problem. This matter cannot be settled by modifying the antistatic coating location within the stack.

The inventors have also determined the characteristic of the substrates that are prone to develop this type of defects, once they have been coated with an antistatic antireflection (or reflective) coating, and which substrates do not present this type of defect, whatever the nature of the antistatic layer.

The present invention underlies the fact that using in an antireflection or reflective coating, some $SnO_2$-based antistatic layers, does not cause cosmetic defects to appear on substrates, the water uptake rate of which is greater than 0.6% by weight and thus preserves the transparency, in particular over time, of said coating, thus preventing the same from getting damaged.

The set objectives are aimed at according to the invention through an optical article having antistatic properties and antireflection or reflective properties, comprising a substrate having at least one main surface coated with an antireflection or reflective coating, said coating comprising at least one electrically conductive layer comprising at least 30%, preferably at least 40% and more preferably at least 50% tin oxide by weight ($SnO_2$) relative to the total weight of the electrically conductive layer, said electrically conductive layer having been deposited by ion-assisted deposition, and said substrate having a water uptake rate equal to or greater than 0.6% by weight relative to the total weight of said substrate, the water uptake rate being measured after predrying said substrate and then storing it for 800 hours in a chamber at 50° C. under 100% relative humidity and at atmospheric pressure.

The invention also relates to a method for making such an optical article, comprising at least:

providing an optical article comprising a substrate with at least one main surface, said substrate having a water uptake rate equal to or greater than 0.6% by weight relative to the total weight of said substrate, the water uptake rate being measured such as described hereabove;

depositing onto said substrate's main surface an antireflection or reflective coating, said coating comprising at least one electrically conductive layer, comprising at least 30% tin oxide ($SnO_2$) by weight relative to the total weight of the electrically conductive layer, said electrically conductive layer being deposited by ion-assisted deposition, recovering an optical article comprising a substrate, the main surface of which has been coated with said antireflection or reflective coating comprising said electrically conductive layer.

The rest of the description does essentially refer to antireflection coatings but also applies to reflective coatings, mutatis mutandis. The invention applies nevertheless preferably to antireflection coatings.

In the present application, when an optical article comprises one or more coatings on its surface, the expression "depositing a layer or a coating onto the article" is intended to mean that a layer or a coating has been deposited onto the outer (exposed) surface of the external coating of the article, that is to say the coating the most distant from the substrate.

A coating which is "on" a substrate or which has been deposited "onto" a substrate is defined as a coating which (i) is positioned over the substrate, (ii) is not necessarily in contact with the substrate, that is to say one or more intermediate coatings may be deposited between the substrate and the coating in question, and (iii) does not necessarily cover the substrate completely. When "a layer 1 is located under a layer 2", it means that the layer 2 is more distant from the substrate than the layer 1.

The optical article prepared according to the invention comprises a substrate, preferably transparent, having main front and rear faces, at least one of said main faces comprising an antireflection antistatic coating, preferably the two main faces.

As used herein, the rear face (typically concave) of the substrate is intended to mean the face which, when using the article, is the nearest from the wearer's eye. On the contrary, the front face (typically convex) of the substrate is intended to mean the face which, when using the article, is the most distant from the wearer's eye.

Although the article of the invention may be any optical article, such as a screen or a mirror, this is preferably an optical lens, more preferably an ophthalmic lens, or an optical or ophthalmic lens blank. The lens may be a polarized, a tinted or a photochromic lens. Preferably, the ophthalmic lens of the invention has a high transmission.

The antireflection coating of the invention may be formed onto at least one of the main faces of a bare substrate, that is to say a not coated substrate, or onto at least one of the main faces of an already coated substrate having one or more functional coatings.

The substrate for the optical article of the invention is necessarily an organic glass, for example a thermoplastic or thermosetting plastic material.

It should have a water uptake rate equal to or greater than 0.6% by weight relative to the total weight of said substrate, preferably equal to or greater than 0.7%, the water uptake rate being measured after predrying said substrate and storing it for 800 hours in a chamber at 50° C. under 100% relative humidity and at atmospheric pressure. The inventors have observed indeed that the substrates with a water uptake rate lower than 0.6% by weight under the hereabove indicated test conditions did not result in the formation of cosmetic defects.

Determining the water uptake rate of a substrate requires traditional procedures which are well known from the person skilled in the art and can be easily implemented. They are described in detail in the experiment part hereunder.

The substrate for the optical article of the invention may be selected from the following material families, provided they satisfy the hereabove mentioned water uptake rate characteristic: (meth)acrylic (co)polymers, in particular poly(methyl methacrylate) (PMMA), thio(meth)acrylic (co)polymers, polyvinyl butyral (PVB), polyurethanes (PU), poly(thiourethanes), polyol allylcarbonate (co)polymers, thermoplastic ethylene/vinyl acetate copolymers, polyesters such as poly (ethylene terephthalate) (PET) or poly(butylene terephthalate) (PBT), polyepoxides, polycarbonate/polyester copolymers, cycloolefin copolymers such as ethylene/norbornene or ethylene/cyclopentadiene copolymers, and combinations thereof. Of course the substrates may be obtained through polymerization of monomer mixtures, or may also comprise mixtures of such polymers and copolymers.

Particularly preferred classes of substrates include poly (thiourethanes), polyepisulfides and resins resulting from the polymerization or copolymerization of alkyleneglycol bis allylcarbonates, provided they have a water uptake rate equal to or greater than 0.6%.

Examples of substrates to be suitably used in the present invention include those obtained from MR6®, MR7® and MR8® resins (thermosetting polythiourethane resins). The various substrates based on polythiourethane resins are marketed by the Mitsui Toatsu Chemicals company and these substrates as well as the monomers used for their preparation are especially described in the patents U.S. Pat. Nos. 4,689,387, 4,775,733, 5,059,673, 5,087,758 and 5,191,055.

The substrates obtained through (co)polymerization of the diethyleneglycol bis allyl carbonate are also suitable (lenses ORMA® ESSILOR). The monomer acting as the synthesis basis is sold, for example, under the trade name CR-39® by the PPG Industries company.

Examples of substrates that are not for use in the present invention, because their water uptake rate is much lower than 0.6% are mineral substrates (silica-based glasses), the 1,74® substrate, based on a polyepisulfide resin, and substrates based on a bisphenol-A homopolycarbonate resin, marketed especially by the TEIJIN company under the trade name PANLITE®, by GENERAL ELECTRIC COMPANY under the trade name LEXAN®, by the BAYER company under the trade name BAYBLEND®, by MOBAY CHEMICAL Corp. under the trade name MAKROLON® and by DOW CHEMICAL Co. under the trade name CALIBRE®.

Prior to depositing the antistatic coating onto the substrate, it is usual for the surface of said substrate to be submitted to a chemical or physical activating preliminary treatment intended to increase the adhesion of the antireflection coating. This pretreatment is generally performed under vacuum and may consist in a bombardment with energetic and/or reactive species, for example with an ion beam ("Ion Pre-Cleaning" or "IPC") or with an electron beam, a corona discharge treatment, an ion spallation, an ultraviolet treatment or a plasma treatment under vacuum, typically with an oxygen or argon type plasma. It may also be an acid or basic treatment and/or a solvent-based surface treatment (water or any organic solvent). Many of these methods may be combined. Such cleaning treatments make it possible to optimize the cleanliness and the reactivity of the substrate's surface.

As used herein, energetic (and/or reactive) species are especially intended to mean ionic species having an energy ranging from 1 to 300 eV, preferably from 1 to 150 eV, more preferably from 10 to 150 eV, and even more preferably from 40 to 150 eV. Energetic species may be chemical species such as ions, radicals or species such as photons or electrons.

The most preferred preliminary treatment for the substrate's surface is an ionic bombardment using an ion gun, ions being particles made of gas atoms from which are extracted one or more electrons. Argon ($Ar^+$ ions) is preferably used as the ionized gas, but oxygen may also be used, or combinations thereof, under an accelerating voltage ranging typically from 50 to 200 V, a current density ranging typically from 10 to 100 $\mu A/cm^2$ on the activated surface, and typically under a residual pressure in the vacuum chamber that may vary from $8.10^{-5}$ mbar to $2.10^{-4}$ mbar.

The optical article of the invention comprises an antireflection (or reflective) coating, preferably formed on an abrasion-resistant coating.

In addition to the one or more layers based on tin oxide it contains, the antireflection or reflective coating may be any antireflection or reflective coating classically used in the optics field, in particular in ophthalmic optics.

An antireflection coating is defined as a coating, deposited onto the surface of an optical article, which improves the anti-reflecting properties of the final optical article. It enables reducing the light reflection at the article-air interface over a relatively large range of the visible spectrum.

A reflective coating obtains the opposite effect, that is to say it increases the reflection of the light rays. Such a type of coating is used for example to obtain a mirror effect in solar lenses. Antireflection or reflective coatings may also have one or more layers absorbing in the visible spectrum leading to optical articles to be suitably used for sunglasses.

As is also well known, antireflective coatings traditionally comprise a monolayered or a multilayered stack composed of dielectric materials. These are preferably multilayered coatings, comprising layers with a high refractive index (HI) and layers with a low refractive index (LI).

Reflective coatings are made of layers of the same nature as antireflection coatings, but their refractive indices, the number and the thickness of the layers are chosen so that the coating has a reflective effect, which is well known from the man skilled in the art.

In the present application, a layer in an antireflective stack is said to be a high refractive index layer when the refractive index thereof is higher than 1.55, preferably higher than or equal to 1.6, more preferably higher than or equal to 1.8 and even more preferably higher than or equal to 2.0. A layer in an antireflective stack is said to be a low refractive index layer when the refractive index thereof is lower than or equal to 1.55, preferably lower than or equal to 1.50, more preferably lower than or equal to 1.45. Unless otherwise indicated, the refractive indices which are referred to herein are determined at 25° C. at a wavelength of 550 nm.

HI layers are classical high refractive index layers, well known in the art. They typically comprise one or more mineral oxides such as, without limitation, zirconia ($ZrO_2$), titanium dioxide ($TiO_2$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, $Dy_2O_5$, $Nb_2O_5$, $Y_2O_3$. In one embodiment of the invention, a $SnO_2$-based layer according to the invention forms a HI layer in the antireflection coating. Preferred materials are $TiO_2$, $PrTiO_3$, $ZrO_2$, $SnO_2$ and their combinations.

In one particular embodiment of the invention, at least one HI layer of the antireflection coating is a $TiO_2$-based layer, the high refractive index of which is particularly interesting. It is preferably deposited by ion-assisted deposition (IAD), which increases the compression of this layer and therefore its refractive index.

In another particular embodiment of the invention, at least one HI layer of the antireflection coating is a $PrTiO_3$-based layer, the high thermal resistance of which is particularly interesting.

LI layers are also well known and may comprise, without limitation, $SiO_2$, $MgF_2$, $ZrF_4$, alumina ($Al_2O_3$), in a small amount, $AlF_3$, chiolite ($Na_3Al_3F_{14}$), cryolite ($Na_3[AlF_6]$), and their combinations, preferably $SiO_2$ or $SiO_2$ doped with alumina, which contributes to increase the thermal resistance of the antireflection coating. SiOF layers ($SiO_2$ doped with fluorine) may also be used.

When using a LI layer comprising a mixture of $SiO_2$ and $Al_2O_3$, this preferably comprises from 1 to 10%, more preferably from 1 to 8% and even more preferably from 1 to 5% by weight of $Al_2O_3$ relative to $SiO_2+Al_2O_3$ total weight in this layer. A too high amount of alumina may be detrimental to the adhesion of the AR coating and would excessively increase the refractive index of this layer. In one preferred embodiment, at least one LI layer of the antireflection coating comprises a mixture of $SiO_2$ and $Al_2O_3$, preferably consists in a mixture of $SiO_2$ and $Al_2O_3$.

One preferred embodiment of the invention consists in using one or more LI layers comprising a mixture of $SiO_2$ and $Al_2O_3$ in the antireflection coatings of the invention, enabling to obtain antireflection coatings that are both antistatic and have an improved critical temperature, that is to say, having a good cracking resistance when submitted to temperature rise.

The inventors have observed that, in the stacks of the invention, the presence of one or more LI layers comprising a mixture of $SiO_2$ and $Al_2O_3$ could contribute and even promote very significantly the occurrence of cosmetic defects. The inventors have found that is was preferable to deposit such mixed $SiO_2/Al_2O_3$ layers by introducing into the deposition chamber, during the deposition process of the same, a gas, preferably a rare gas, such as argon, xenon, krypton, neon or oxygen, or a mixture of two of them or more.

Thus, the present invention provides a preferred antireflection coating, comprising at least one electrically conductive layer comprising at least 30% by weight of $SnO_2$ and at least one $SiO_2/Al_2O_3$ low refractive index layer deposited under gas supply in the vacuum chamber during said deposition.

Such gas supply enables to regulate the pressure within the deposition chamber during the deposition process of the $SiO_2/Al_2O_3$ layer. The recommended pressure range within the chamber during the supply of one or more gas(es) does typically range from $5.10^{-5}$ to $3.10^{-4}$ mbar, preferably from $1.10^{-4}$ to $3.10^{-4}$ mbar and more preferably from $1.5.10^{-4}$ to $3.10^{-4}$ mbar.

Such gas supply differs from an ion bombardment such as ion-assisted deposition (IAD), and also differs from a step for evaporating materials such as $SiO_2$ and $Al_2O_3$.

Generally, HI layers have a physical thickness ranging from 10 to 120 nm, and LI layers have a physical thickness ranging from 10 to 100 nm.

Preferably, the total thickness of the antireflection coating is lower than 1 micrometer, more preferably lower than or equal to 800 nm and even more preferably lower than or equal to 500 nm. The total thickness of the antireflection coating is typically higher than 100 nm, preferably higher than 150 nm.

Yet more preferably, the antireflection coating comprises at least two low refractive index layers (LI) and at least two high refractive index layers (HI). Preferably, the total number of layers in the antireflection coating is lower than or equal to 8, more preferably lower than or equal to 6.

HI layers and BI layers do not need to alternate within the antireflection coating, although they also can in accordance with one embodiment of the invention. Two HI layers (or more) may be deposited on one another, as well as two LI layers (or more) may be deposited on one another.

In one embodiment of the invention, the antireflection coating comprises a sub-layer. In that case, it typically forms the first layer of this antireflection coating in the layer deposition given order, that is to say the layer of the antireflection coating which contacts the underlying coating (which is typically the abrasion-resistant and scratch-resistant coating) or the substrate, when the antireflection coating is directly deposited onto the substrate, except in the special case when a tin oxide-based layer of the invention forms the first layer of the antireflection coating.

As used herein, the sub-layer of the antireflection (or reflective) coating, or adhesion layer, is intended to mean a coating with a relatively high thickness, used for improving the abrasion and/or scratch resistance of said coating and/or for promoting the adhesion thereof to the substrate or to the underlying coating.

Considering its relatively high thickness, the sub-layer does not typically take part to the antireflection (or reflective) optical activity, in particular where it has a refractive index close to that of the bare substrate, if the sub-layer is deposited onto the bare substrate, or close to that of the coating if the sub-layer is deposited onto a coated substrate. The difference will be made in the following specification between the sub-layer and the layers of the antireflection coating deposited onto this sub-layer, by calling the latter optical layers, as opposed to the sub-layer which does not form an optical effect-providing layer.

The sub-layer should have a sufficient thickness to promote the abrasion resistance of the antireflection coating, but preferably not high to such an extent it would cause a light absorption which, depending on the nature of the sub-layer, should significantly reduce the light transmittance $\tau_v$.

The sub-layer preferably comprises a $SiO_2$-based layer, with a thickness preferably higher than or equal to 75 nm, more preferably higher than or equal to 80 nm, more preferably higher than or equal to 100 nm and even more preferably higher than or equal to 150 nm. Its thickness is typically lower than 250 nm, more preferably lower than 200 nm. In one particular embodiment, the sub-layer consists in a $SiO_2$ layer.

Said $SiO_2$-based layer may comprise, in addition to silica, one or more other materials traditionally used for making sub-layers, for example one or more materials chosen from the dielectric materials previously described in the present specification.

It is preferred to use a sub-layer of the monolayer type. However, the sub-layer may be laminated (multilayers). The sub-layers to be suitably used in the context of the present invention are described in more detail in the applications WO 2008/107325 and WO 2009/004222, incorporated herein as a reference.

The various layers of the antireflection coating (amongst which the antistatic layer) are preferably deposited through deposition under vacuum according to anyone of the following methods: i) by optionally ion-beam assisted, evaporation; ii) by ion-beam sputtering; iii) by cathode sputtering; iv) by plasma-assisted chemical vapor deposition. These various methods are described in "Thin Film Processes" and "Thin Film Processes II," Vossen & Kern, Ed., Academic Press, 1978 and 1991 respectively. The evaporation under vacuum is the most recommended method.

Preferably, the deposition of each of the layers of the antireflection coating is performed by evaporation under vacuum.

It is possible to carry out a treatment step with energetic species such as previously defined, concomitantly to the deposition of one or more of the different layers forming the antireflection coating.

The ion-assisted deposition method or "IAD" is especially described in the patent application US 2006/017011 and in the patent U.S. Pat. No. 5,268,781. It does not require any heating of the substrates, which is interesting for coating heat-sensitive substrates such as substrates in organic glass.

Ion-assisted evaporation, consists in depositing a layer of a material onto a substrate by evaporation under vacuum by simultaneously bombarding the surface of the substrate with an ion-beam produced by an ion gun, ions being particles made of gas atoms from which one or more electrons is or are extracted. The ion bombardment causes during the deposition process an atom rearrangement in the layer, which enables to settle the same during its own formation. In addition to a densification, IAD enables to improve the adhesion of the deposited layers and to increase their refractive index.

It preferably consists in a bombardment of the surface to be treated through oxygen ions, with a current density typically ranging from 10 to 200 µA/cm$^2$, preferably from 30 to 100 µA/cm$^2$ on the activated surface and typically under a residual pressure in the vacuum chamber that may vary from $6.10^{-5}$ mbar to $2.10^{-4}$ mbar, preferably from $8.10^{-5}$ mbar to $2.10^{-4}$ mbar. Other ionized gases may be used in combination or not with oxygen, as for example argon, nitrogen, especially a mixture of $O_2$ and argon in a volume ratio of 2:1 to 1:2.

Optionally, chemical or physical activating treatments may be performed on the surface of one or more of the antireflection coating layers prior to depositing the next layer, in particular on the surface of the penultimate layer of this coating and/or on the surface of the sub-layer, when present.

The chemical or physical activating treatment may be selected from pre-treatments to which the substrate may be submitted and which have already been mentioned hereabove. The preferred pretreatment is an ion bombardment. Usually conducted under vacuum, by using for example an argon ion-beam generated by means of an ion gun, it typically makes it possible on one hand to improve abrasion resistance properties of the antireflection coating, and on the other hand to reinforce its adhesion properties.

Antireflection coatings to be suitably used and their methods of preparation are described in more detail in the patent WO 2009/004222, which is incorporated herein as a reference.

The article of the invention is made antistatic by incorporating into the antireflection coating at least one electrically conductive layer comprising at least 30%, preferably at least 40% and more preferably at least 50% tin oxide by weight ($SnO_2$) relative to the total weight of the electrically conductive layer. This layer is commonly referred to as the "tin oxide-based layer" in the present application.

Preferably, the weight ratio of the tin oxide relative to said electrically conductive layer is higher than or equal to one of the following values: 70%, 75%, 80%, 90%, 95%, 97%, 99%, 99,5%, 99,9%, 99,95%. Most preferably, said electrically conductive layer consists in a $SnO_2$ layer.

Said tin oxide-based layer of the invention may comprise other components, especially metal oxides, in particular electrically conductive metal oxides, which are preferably highly transparent. It may especially comprise titanium dioxide and/or zinc oxide.

Preferably, the electrically conductive layer of the invention does not comprise indium, whatever its form, for example metal indium or indium oxide.

The electrically conductive layer may be provided in various locations within the antireflection coating, so long as its anti-reflecting properties are not affected. It may for example be deposited onto the sub-layer (when present), that is to say be inserted between the sub-layer and the other layers of the antireflection coating. It may also be deposited under the sub-layer (when present), that is to say be inserted between the sub-layer and the substrate optionally coated with functional coatings. More generally, it may form the first layer of the antireflection coating (in the deposition order), that is to say be directly deposited onto the substrate optionally coated with functional coatings. It is preferably located between two optical dielectric layers of the antireflection coating, and/or under a low refractive index optical layer of the antireflection coating. In the most preferred embodiment of the invention, the $SnO_2$-based layer represents the penultimate layer of the antireflection coating in the stack order, the last layer of said antireflection coating being preferably a LI layer.

In one particular embodiment of the invention, said $SnO_2$-based layer does not represent the last layer (outer layer) of the antireflection coating. In another particular embodiment of the invention, said $SnO_2$-based layer does not represent the first layer of the antireflection coating.

The electrically conductive layer should be thin enough not to alter the transparency of the antireflection coating. Generally, its thickness does vary from 0.1 to 150 nm, more preferably from 0.1 to 50 nm. A thickness lower than 0.1 nm typically does not allow to obtain a sufficient electrical conductivity, whereas a thickness higher than 150 nm typically does not allow to obtain the transparency and low absorption required properties. Its thickness does preferably vary from 0.1 to 30 nm, more preferably from 1 to 20 nm and even more preferably from 1 to 15 nm. In one embodiment of the invention, the thickness of said electrically conductive layer is higher than or equal to 6 nm. Any thickness indicated in the present application refers to physical thickness.

Generally, the electrically conductive layer based on $SnO_2$ contributes to obtaining anti-reflective properties, especially when not located under an optional sub-layer, and forms a high refractive index layer in the antireflection coating (refractive index of about 2).

According to one essential characteristic of the invention, the deposition of said electrically conductive layer is performed under ionic assistance, a technique which has been previously described to reduce the absorption in the visible of the $SnO_2$-based layer and to obtain a good adhesion.

The inventors have noticed that it is possible to increase the ion bombardment force upon depositing a conductive layer having a sufficient $SnO_2$ amount without significantly increasing the frequency of occurrence of cosmetic defects developing subsequently, but on the contrary that such an increase in the ion bombardment forces typically results in a strong increase in cosmetic defects for the layers submitted to such a bombardment, in particular conductive layers based on conductive metal oxides. Especially advantageously, the antireflection coating comprises, in addition to at least one, preferably only one, electrically conductive layer which provides the article with antistatic properties, at least four dielectric layers, preferably four or five.

In one preferred embodiment, the antireflection coating of the invention comprises, in the deposition order onto the surface of the optionally coated substrate, a $ZrO_2$ layer, with a thickness ranging typically from 10 to 40 nm and preferably from 15 to 35 nm, a $SiO_2$ layer or a $SiO_2/Al_2O_3$ layer, with a thickness ranging typically from 10 to 40 nm and preferably from 15 to 35 nm, a $ZrO_2$ layer or a $TiO_2$ layer, with a thickness ranging typically from 40 to 150 nm, preferably from 50 to 120 nm, a $SnO_2$-based layer according to the invention, preferably a $SnO_2$ layer, with a thickness ranging typically from 4 to 25 nm and preferably from 5 to 20 nm, and a $SiO_2$ layer or a $SiO_2/Al_2O_3$ layer, with a thickness ranging typically from 40 to 150 nm, preferably from 50 to 100 nm.

The antireflection coating may be deposited directly onto a bare substrate. In some applications, it is preferred for the substrate's main surface to be coated with one or more functional coatings prior to depositing the antireflection coating of the invention. These functional coatings classically employed in optics may be, without limitation, an impact-resistant primer layer, an abrasion-resistant and/or scratch-resistant coating, a polarized coating, a photochromic coating or a tinted coating, in particular an impact-resistant primer layer coated with an abrasion-resistant and/or scratch-resistant layer.

The antireflection coating is preferably deposited onto an abrasion-resistant and/or scratch-resistant coating. The abrasion-resistant and/or scratch-resistant coating may be any layer classically used as an abrasion-resistant and/or scratch-resistant coating in the field of ophthalmic lenses.

Abrasion-resistant and/or scratch-resistant coatings are preferably hard coatings based on poly(meth)acrylates or silanes, comprising typically one or more mineral fillers to increase the hardness and/or the refractive index of the coating once hardened. As used herein, a (meth)acrylate is intended to mean an acrylate or a methacrylate.

Abrasion-resistant and/or scratch-resistant hard coatings are preferably prepared from compositions comprising at least one alkoxysilane and/or a hydrolyzate thereof, obtained for example through hydrolysis with a hydrochloric solution, and optionally condensation and/or curing catalysts and/or surfactants.

To be mentioned amongst the recommended coatings of the present invention are coatings based on epoxysilane hydrolyzates such as those described in the patents EP 0614957, U.S. Pat. Nos. 4,211,823 and 5,015,523.

Many examples of condensation and/or curing catalysts to be suitably used are indicated in "Chemistry and Technology of the Epoxy Resins", B. Ellis (Ed.) Chapman Hall, New York, 1993 and "Epoxy Resins Chemistry and Technology" 2d edition, C. A. May (Ed.), Marcel Dekker, New York, 1988.

A preferred abrasion-resistant and/or scratch-resistant coating composition is the one disclosed in the patent EP 0614957, in the name of the applicant. It is described in the experimental section.

The abrasion-resistant and/or scratch-resistant coating composition may be deposited onto the substrate's main surface by dip-coating or spin-coating. It is thereafter cured in a suitable way (preferably using a heat- or an UV-treatment).

The thickness of the abrasion-resistant and/or scratch-resistant coating does typically range from 2 to 10 μm, preferably from 3 to 5 μm.

Prior to depositing the abrasion-resistant and/or scratch-resistant coating, it is possible to deposit onto the substrate a primer coating thus improving the impact resistance and/or the adhesion of the following layers in the final product.

This coating may be any impact-resistant primer layer classically used for articles in a transparent polymeric material, such as ophthalmic lenses.

Preferred primer compositions include compositions based on thermoplastic polyurethanes, such as those described in the patents JP 63-141001 and JP 63-87223, poly(meth)acrylic primer compositions, such as those described in the patent U.S. Pat. No. 5,015,523, compositions based on thermosetting polyurethanes, such as those described in the patent EP 0404111 and compositions based on poly(meth)acrylic latexes or polyurethane latexes, such as those described in the patents U.S. Pat. No. 5,316,791 and EP 0680492.

Preferred primer compositions are compositions based on polyurethanes and compositions based on latexes, in particular polyurethane latexes and poly(meth)acrylic latexes, as well as their combinations.

Poly(meth)acrylic latexes are latexes based on copolymers essentially made of a (meth)acrylate, such as for example ethyl (meth)acrylate, butyl (meth)acrylate, methoxyethyl (meth)acrylate or ethoxyethyl (meth)acrylate, with at least one other co-monomer in a typically lower amount, such as for example styrene.

Commercially available primer compositions to be suitably used in the invention include the Witcobond® 232, Witcobond® 234, Witcobond® 240, Witcobond® 242 compositions (marketed by BAXENDEN CHEMICALS), Neorez® R-962, Neorez® R-972, Neorez® R-986 and Neorez® R-9603 (marketed by ZENECA RESINS).

These primer compositions may be deposited onto the surfaces of the article by dip-coating or spin-coating, then be dried at a temperature of at least 70° C. and up to 100° C., preferably of about 90° C., for a time period ranging from 2 minutes to 2 hours, typically of about 15 minutes, to form primer layers having a thickness, after curing, of from 0.2 to 2.5 μm, preferably of from 0.5 to 1.5 μm.

The optical article of the invention may also comprise coatings formed on the antireflection coating, which can modify the surface properties thereof, such as hydrophobic and/or oleophobic coatings (antifouling top coat). These coatings are preferably deposited onto the outer layer of the antireflective coating. Their thickness is generally lower than or equal to 10 nm, preferably ranging from 1 to 10 nm, more preferably ranging from 1 to 5 nm.

There are typically coatings of the fluorosilane or fluorosilazane type. They may be obtained by depositing a fluorosilane or fluorosilazane precursor, comprising preferably at least two hydrolyzable groups per molecule. The fluorosilane precursors preferably comprise fluoropolyether groups and more preferably perfluoropolyether groups. These fluorosilanes are well known and are described, amongst others, in the U.S. Pat. Nos. 5,081,192, 5,763,061, 6,183,872, 5,739, 639, 5,922,787, 6,337,235, 6,277,485 and in the European patent N° 0 933 377.

A preferred hydrophobic and/or oleophobic coating composition is marketed by Shin-Etsu Chemical under the trade name KP 801M®. Another preferred hydrophobic and/or oleophobic coating composition is marketed by Daikin Industries under the trade name OPTOOL DSX®. It is a fluorinated resin comprising perfluoropropylene groups.

Typically, an optical article of the invention comprises a substrate that is successively coated with an impact-resistant primer layer, an abrasion-resistant and/or scratch-resistant coating, an antireflection (or reflective) and antistatic coating of the invention and with a hydrophobic and/or oleophobic coating.

Using a tin oxide-based layer in an antireflection coating has many advantages as compared to optical articles with antireflection properties comprising an antistatic layer based on materials such as ITO, indium oxide or zinc oxide. Indeed, ITO layers, indium oxide ($In_2O_3$) layers, zinc oxide layers or doped zinc oxide layers all cause cosmetic defects to appear when present in an antireflection coating deposited onto a substrate according to the invention, that is to say having a water uptake rate equal to or greater than 0.6% by weight, which is not the case for the $SnO_2$-based layer of the invention.

In addition, an ITO-based antistatic layer as a drawback absorbs in the visible range much more than a $SnO_2$ layer of the same thickness, due to its higher yellow index. Such defect is strongly perceptible with layers having a relatively lesser thickness, an ITO layer being typically perceived as yellow with thicknesses of about 13 nm, despite an ion-assisted deposition, when the substrate is examined visually on the edge, whereas a 50 nm-thick $SnO_2$ layer still remains transparent.

Replacing a classical ITO layer comprising typically about 5% $SnO_2$ with a $SnO_2$ layer, which is a very transparent, electrically conductive material, results in identical antistatic properties and preserves the optical properties, in particular the optical article transparency.

Moreover, the method of the invention involving tin oxide can be more easily controlled as compared to the corresponding method involving ITO, thus improving the productivity.

The various layers of the antireflection coating of the invention have good adhesion properties, in particular at the substrate interface. The adhesion properties to the substrate of the antireflection coating as a whole have been checked by means of the test commonly called "n×10 counts", by following the procedure described in the world patent WO 99/49097.

Preferably, the optical article of the invention does not absorb, or very few, in the visible, which means, according to the present application, that its visible light transmission factor $\tau_v$, also called light transmittance in the visible, is greater than 90%, more preferably greater than 95%, even more preferably greater than 96% and most preferably greater than 97%.

The factor $\tau_v$ corresponds to the international standard definition (ISO13666 standard: 1998) and is measured according to ISO8980-3 standard. It is defined within the wavelength range of from 380 to 780 nm.

Preferably, the light absorption of the optical article coated according to the invention is lower than or equal to 1%.

More preferably, the mean reflectance factor in the visible range (400-700 nm) for an article coated with an antireflection coating of the invention, noted $R_m$, is lower than 2.5% per face, more preferably lower than 2% per face and even more preferably lower than 1% per face of the article. In a very especially preferred embodiment, the article comprises a substrate which the two main surfaces are coated with an antireflection coating of the invention and have a $R_m$ total value (cumulated reflection of both faces) lower than 1%, preferably ranging from 0.7 to 0.8%. Means to achieve such $R_m$ values are well known from the person skilled in the art.

The light reflectance factor Rv of an antireflection coating of the invention, is lower than 2.5% per face, preferably lower than 2% per face, more preferably lower than 1% per face of the article, more preferably ≤0.75%, even more preferably ≤0.5% and most preferably ≤0.4%.

In the present application, the "mean reflectance factor" $R_m$ (spectrum reflection mean over the whole 400-700 nm visible spectrum) and the light reflectance factor $R_v$ are such as defined in the ISO 13666:1998 standard and measured according to the ISO 8980-4 standard.

The optical articles of the invention have a discharge time (i.e. time that is necessary for a static charge to dissipate) ≤500 milliseconds. Optical articles of the invention even enable to reach discharge times ≤200 milliseconds and more preferably ≤100 and even more preferably ≤75 milliseconds. Advantageously, their antistatic properties are stable over time, which means that the previously mentioned characteristics associated with the discharge time are still confirmed at least 6 months after the optical article production.

The following examples are intended to illustrate the present invention in more detail but without limiting it thereto.

EXAMPLES

1. General Procedures

The optical articles used in the examples comprise a substrate of an ORMA® ESSILOR lens diameter 65 nm, power −2,00 diopters and thickness 1.2 mm, coated: i) with a polyurethane latex based, impact-resistant primer coating containing polyester units, cured at 90° C. for 1 hour (Witcobond® 234 from BAXENDEN CHEMICALS, spin-coating for 1500 rpm for 10 to 15 seconds); ii) with the abrasion-resistant and scratch-resistant coating (hard coat) disclosed in Example 3 of the patent EP 0614957 (refractive index 1.50), based on an epoxytrialkoxysilane hydrolyzate (γ-glycidoxypropyltrimethoxysilane, GLYMO) and dialkyl dialkoxysilane (dimethyldiethoxysilane, DMDES), colloidal silica and aluminum acetylacetonate; iii) with an antireflection coating; and i) with an antifouling coating.

Said abrasion-resistant and scratch-resistant coating was obtained by deposition and curing of a composition comprising by weight, 224 parts of GLYMO, 80.5 parts of HCl 0.1 N, 120 parts of DMDES, 718 parts of colloidal silica 30% by weight in methanol, 15 parts of aluminum acetylacetonate (curing catalyst) and 44 parts of ethylcellosolve. The composition further comprises 0.1% of surfactant FLUORAD™ FC-430® from 3M by weight relative to the composition total weight.

The layers of the antireflection coating have been deposited without heating the substrates, by evaporation under vacuum and optionally, when specified, under oxygen ion-beam assistance during the deposition (evaporation source: electron gun).

The antifouling coating has been obtained by evaporation under vacuum of the Optool DSX® compound from the company Daikin Industries (thickness: 1-5 nm).

The deposition frame is a BAK 760 Physimeca machine fitted with an electron gun (8 kV) for evaporating oxides, a crucible heated by Joule effect for depositing the top coat and a Commonwealth Mark II ion gun provided with a Veeco power supply for the preparation preliminary phase for the substrate's surface using argon ions (IPC), as well as for layers requiring ion-assisted deposition (IAD).

The antistatic layers were formed according to the invention from $SnO_2$ granules provided by the company Cerac (Reference: T-1218, diameter: 3-12 mm, item n°: H618828 purity: 99,9%), and in the Comparative examples from ITO granules (weight percentage tin oxide (5)-indium oxide (95)) provided by the company Optron Inc. The other layers of the antireflection coating were formed from $ZrO_2$ granules (Umicore) or $SiO_2$ granules (Optron Inc.).

As a comparative means assays are also provided with Cerac $In_2O_3$ monolayers 3-12 mm (1-1071 item n°: H608830), $B_2O_3$-doped ZnO monolayers Cerac 3-12 mm (Z-2070 item n°H614757-1), Al-doped ZnO monolayers.

The thickness of the layers was controlled using a quartz microbalance.

The measurements corresponding to the light transmission across the glasses have been performed using a spectrophotometer from the Zeiss Company one hour after the glass preparation. The stability of the τv values obtained has been verified by making a second measurement one week later.

2. Operating Procedures

The method for preparing optical articles comprises the introduction of the substrate coated with the primer coating and the coating abrasion-resistant described hereabove into a vacuum deposition chamber, followed with a step of pumping until obtaining a high vacuum, a step of activating the substrate's surface with an argon ion-beam (IPC: 1 minute, 100 V, 1 A), the interruption of the ion radiation and the deposition by evaporation:

of a $ZrO_2$ layer with a deposition rate of 0.3 nm/s,
of a $SiO_2$ layer with a rate of 0.7 nm/s,
of a $ZrO_2$ layer with a rate of 0.3 nm/s,
of an electrically conductive layer under oxygen ion assistance (1.2 A/100V) with a rate of 0.15 nm/s ($SnO_2$, or ITO for the Comparative examples),
of a $SiO_2$ layer with a rate of 1 nm/s,
of an antifouling coating layer (top coat) (Optool DSX™ from Daikin),
and last a ventilation step.

The hereabove mentioned thicknesses with the deposition rates are physical thicknesses.

3. Characterizations a. Characterization of the Abrasion Resistance

The abrasion resistance has been evaluated by determining the BAYER ASTM values (Bayer sand) and the Bayer ISTM values (Bayer alumina) on substrates coated with the antireflection coating according to the methods described in the patent application WO 2008/001011 (standard ASTM F 735.81). The higher the BAYER test value, the stronger the abrasion resistance.

Thus, the Bayer ASTM value (Bayer sand) is said to be good when R is equal to or greater than 3.4 and lower than 4.5. The Bayer ISTM value is said to be good when R is equal to or greater than 3 and lower than 4.5. The Bayer Sand or ISTM value is said to be excellent when values reach 4.5 or higher.

b. Characterization of the Adhesion of the Antireflection Coating to the Substrate (Test n×10 Counts)

This qualitative test known as the "n×10 counts" enables to evaluate the adhesion properties of a layer deposited onto a substrate, especially the adhesion of an antireflection coating to a substrate for ophthalmic lenses. It has been performed on the convex face of the lenses by following the procedure described in the world patent WO 99/49097.

A stress (or a cycle) consists in 10 backward and forward motions of the eraser. The operator does visually control the condition of the tested lens every 3 stresses and up to 9 stresses. The appreciation consists in noting the number of stresses a lens can withstand before a defect appears. In the context of the present patent application, the lens is considered as having successfully passed the test when the lens remains unchanged after 9 stresses.

c) Evaluation of the Discharge Time

The discharge time of the optical articles has been measured at room temperature (25° C.) by means of a discharge time measuring device JCI 155 (John Chubb Instrumentation) by following the manufacturer's instruction, after having exposed said optical articles to a corona discharge of −9000 volts for 30 ms.

During these charge and discharge measuring experiments of a glass surface submitted to a corona discharge, the two following parameters have been analyzed: the maximal voltage measured on the surface of the glass, noted $U_{max}$, and the time to reach $1/e=36.7\%$ of the maximal voltage, which corresponds to the discharge time.

The power of the glasses used should be rigorously the same to make performance comparisons possible for the various glasses, because the values recorded by the device depend on the geometry of the glasses.

d) Evaluation of the Possible Occurrence of Cosmetic Defects

There are localized optical defects.

Although such defects are perceptible to the naked eye, for the most pronounced of them, their examination is made easier by reflection with a rake angle using an arc lamp.

The possible presence of cosmetic defects on optical articles (articles of the invention or comparative articles) was evaluated visually under an arc lamp (high intensity lamp), after storage of the articles, immediately after their preparation (reference time t), in a "climatic" chamber with a controlled environment (temperature 40° C., relative humidity 80%, atmospheric pressure), and for a limited period of time.

These storage conditions make it possible to prematurely age the optical articles and to accelerate the possible occurrence of cosmetic defects. The defects that could be observed under the arc lamp came as points or little filaments.

As used herein, the atmospheric pressure means a pressure of 1.01325 Bar.

e) Characterization of the Water Uptake Rate in a Substrate

This test is performed on an optical article bare substrate and enables to determine which substrates will be prone to present cosmetic defects over time, once coated with an antireflection coating comprising a traditional antistatic layer, that is to say a layer which does not comprise tin oxide in the amounts of the invention. The inventors developed this test which provides a good correlation between the water uptake rate of a bare substrate and its tendency to develop cosmetic defects after having received an antireflection and antistatic treatment.

Prior to being introduced within the storage chamber for determining its water uptake rate, the bare substrate was dried (dehydrated) in an oven or a chamber at 45° C. for 48 h under atmospheric pressure, without using any additional dehydrating means. For such dehydration, the moisture content in the oven is close to 0%.

The substrate was then stored for 800 hours in a chamber saturated with water at 50° C., that is to say under a relative humidity (RH) of 100% and at atmospheric pressure. The water uptake rate of the bare substrate was determined by means of a balance AT261 (Mettler Toledo), by weighting the dehydrated substrate, then around 30 seconds after its containment within the wet storage chamber, based on following equation:

Water uptake rate (%)=("substrate weight (t=800 h)"−"initial weight of the dehydrated substrate")/ ("initial weight of the dehydrated substrate")

Various substrates with the same geometry have been tested (biplanes, 65 mm diameter and 2 mm thickness). They are described hereabove and the results of the tests are given in Table 1.

The chambers that were used were all Type UT 6060 chambers, HERAEUS Instruments D-6450 HANAU.

TABLE 1

| Substrate | Water uptake rate (800 h, 50° C., atmP, 100% RH) |
|---|---|
| MR6 ® | 1.7% |
| ORMA ® | 1.5% |
| MR8 ® | 1.9% |
| MR7 ® | 0.89% |
| Polycarbonate (PC) | 0.37% |
| 1.74 ® | 0.12% |
| Mineral glass | <0.6% |

Substrates were obtained from the MR6®, MR7®, MR8® resins marketed by Mitsui Toatsu Chemicals Inc. MR6®, MR7® and MR8® are thiourethane resins (for making thermosetting polythiourethanes). The substrates obtained from MR6® had a refractive index of 1.59 and an Abbe value of 36. Those obtained from MR7® had a refractive index of 1.66 and an Abbe value of 32. Resin 1,74® is a polyepisulfide resin with a refractive index of 1.74. The polycarbonate substrate used is a bisphenol-A homopolycarbonate resin with a refractive index of 1.59 marketed by TEIJIN under the trade name PANLITE®.

The substrate in mineral glass (based on silica) used is an Essilor glass with a refractive index of 1.523.

The ORMA® substrates and those obtained from the MR6®, MR7®, MR8® resins are substrates in accordance with the invention because they possess a water uptake rate equal to or greater than 0.6% by weight as compared to the substrate total weight under the test conditions described hereabove.

The substrates 1,74®, polycarbonate (PC) and in mineral glass are not substrates in accordance with the invention because they possess a water uptake lower than 0.6% by weight as compared to the substrate total weight under the test conditions described hereabove. The problematic occurrence of cosmetic defects could not be observed with these substrates. They did not show any cosmetic defect, whatever their antistatic layer, either based on $SnO_2$ or on ITO (see Table 3).

4. Results a) ORMA® Substrate

The structure of the optical articles obtained in the Examples 1, 2 and in the comparative examples C1 and C2 is detailed hereunder (Table 2). Their performances are also indicated, as regards adhesion, abrasion resistance, antistatic properties, possible presence of cosmetic defects as well as the following optical parameters: the mean reflectance factor in the visible range $R_m$, the mean reflectance factor weighted by the eye sensitivity (light reflection factor) $R_v$, the visible light transmittance $\tau_v$, the hue angle h and the chroma C* in the standard colorimetric system CIE L*a*b*. The results given hereunder correspond to the average of a series of similar articles prepared under the same conditions.

TABLE 2

| Example 1 | |
|---|---|
| Substrate + primer + hard coat | |
| $ZrO_2$ | 30 nm |
| $SiO_2$ | 20 nm |
| $ZrO_2$ | 80 nm |
| $SnO_2$ | 6.5 nm |
| $SiO_2$ | 80 nm |
| Top coat | |
| Bayer sand | 4.3 |
| Bayer ISTM | 8.7 |
| n × 10 counts | ≥9 |
| $\tau_V$ (%) | 98.4 |
| $R_v$ (%) | 0.67 |
| $R_m$ (%) | 0.73 |
| C* | 7.3 |
| h (°) | 144 |
| Discharge time (ms) | 30 |
| Cosmetic defect t + 24 h | No |
| Cosmetic defect t + 2 months | No |

TABLE 2-continued

| Example 2 | |
|---|---|
| Substrate + primer + hard coat | |
| $ZrO_2$ | 30 nm |
| $SiO_2$ | 20 nm |
| $ZrO_2$ | 80 nm |
| $SnO_2$ | 13 nm |
| $SiO_2$ | 80 nm |
| Top coat | |
| Bayer sand | 4.1 |
| Bayer ISTM | 8.3 |
| n × 10 counts | ≥9 |
| $\tau_V$ (%) | 98.6 |
| $R_v$ (%) | 0.64 |
| $R_m$ (%) | 0.72 |
| C* | 6.8 |
| h (°) | 136 |
| Discharge time (ms) | 57 |
| Cosmetic defect t + 24 h | No |
| Cosmetic defect t + 2 months | No |

| Comparative example C1 | |
|---|---|
| Substrate + primer + hard coat | |
| $ZrO_2$ | 30 nm |
| $SiO_2$ | 20 nm |
| $ZrO_2$ | 80 nm |
| ITO | 6.5 nm |
| $SiO_2$ | 80 nm |
| Top coat | |
| Bayer sand | 4.5 |
| Bayer ISTM | 8.5 |
| n × 10 counts | ≥9 |
| $\tau_V$ (%) | 98.1 |
| $R_v$ (%) | 0.75 |
| $R_m$ (%) | 0.70 |
| C* | 7 |
| h (°) | 135 |
| Discharge time (ms) | 50 |
| Cosmetic defect t + 24 h | No |
| Cosmetic defect t + 2 months | Sometimes |

| Comparative example C2 | |
|---|---|
| Substrate + primer + hard coat | |
| $ZrO_2$ | 30 nm |
| $SiO_2$ | 20 nm |
| $ZrO_2$ | 80 nm |
| ITO | 13 nm |
| $SiO_2$ | 80 nm |
| Top coat | |
| Bayer sand | 4.5 |
| Bayer ISTM | 8.5 |
| n × 10 counts | ≥9 |
| $\tau_V$ (%) | 98.1 |
| $R_v$ (%) | 0.75 |
| $R_m$ (%) | 0.70 |
| C* | 7 |
| h (°) | 135 |
| Discharge time (ms) | 50 |
| Cosmetic defect t + 24 h | Yes |
| Cosmetic defect t + 2 months | Yes |

The physico-chemical durability tests performed on the articles of the invention give results that are similar to those obtained on ITO-based stacks (n×10 counts, Bayer). The following parameters are also comparable: $R_m$, $R_v$, C*, h, $\tau_v$, discharge time.

All the optical articles obtained are highly transparent and at the same time benefit from antistatic properties (discharge time lower than 500 ms), antireflection properties, a good abrasion resistance, a good thermal resistance and good adhesion properties. It could be observed that the discharge time of the optical articles prepared was stable over time (no variation after a control 6 months after their preparation).

The lenses of the invention are fully satisfying from the cosmetic point of view since they do not have any visible surface defect, especially when using the arc lamp.

The same does not apply for the comparative lenses, incorporating an ITO layer.

Comparative examples C1 and C2 are obtained, by repeating examples 1 and 2, except that the conductive material $SnO_2$ is replaced by ITO (Material such as described in the general procedure on 1 hereabove). Lenses of comparative example C2 all have cosmetic defects, both initially (t+24 h) and 2 months later (t+2 months), whereas cosmetic defects could be observed after 2 months on some lenses of comparative example C1.

This is not the case of substrates comprising a monolayer of ITO deposited under the same deposition conditions as indicated on 2 hereabove (under oxygen ion assistance (1.2 A/100V) with a rate of 0.15 nm/s, of $In_2O_3$, of $B_2O_3$-doped ZnO, Al-doped ZnO rather than $SnO_2$ (Materials detailed in general procedure on 1 hereabove).

b) Evaluation of Other Substrates

Example 2 and comparative example C2 have been repeated by using other substrates than the ORMA® substrate (Examples 3 and 4 and comparative examples C3 to C10). The results are given in Table 3, summarizing as a review the results of example 2 and comparative example C2.

TABLE 3

| Substrate | Example | Antistatic layer | Cosmetic defect t + 2 months |
|---|---|---|---|
| ORMA ® | 2 | $SnO_2$ | No |
|  | C2 | ITO | Yes |
| MR7 ® | 3 | $SnO_2$ | No |
|  | C3 | ITO | Yes |
| MR8 ® | 4 | $SnO_2$ | No |
|  | C4 | ITO | Yes |
| 1.74 ® | C5 | $SnO_2$ | No |
|  | C6 | ITO | No |
| Polycarbonate (PC) | C7 | $SnO_2$ | No |
|  | C8 | ITO | No |
| Mineral glass | C9 | $SnO_2$ | No |
|  | C10 | ITO | No |

It could be observed that the lenses of the invention, comprising a $SnO_2$ layer in the antireflection coating and a substrate having a water uptake rate equal to or greater than 0.6% by weight as compared to the substrate total weight under the test conditions indicated hereabove do not have any cosmetic defect (examples 2-4). Under the same conditions, the comparative lenses comprising an ITO layer in the antireflection coating and a substrate having a water uptake rate equal to or greater than 0.6% by weight as compared to the substrate total weight under the test conditions indicated hereabove have cosmetic defects (Comparative examples C2 to C5).

Lastly, as previously mentioned, the substrates based on 1.74®, polycarbonate (PC) and mineral glass do not exhibit any cosmetic defect two months later, whether the antistatic layer is based on $SnO_2$ or ITO.

c) Influence of the Thickness of the $SnO_2$ Layer

Example 2 has been repeated by modifying the nature of the substrate (MR8® instead of ORMA®), then by varying the thickness of the $SnO_2$ antistatic layer from 3 to 75 nm. The occurrence of cosmetic defects could be observed and all the results are summarized in Table 4.

TABLE 4

| Example | Thickness of the $SnO_2$ layer (nm) | Observation time | Cosmetic defect |
|---|---|---|---|
| 5 | 3 | t + 5 weeks | No |
| 6 | 6.5 | t + 5 weeks |  |
| 7 | 13 | t + 6 months |  |
| 8 | 20 | t + 5 weeks |  |
| 9 | 26 | t + 4 weeks |  |
| 10 | 32 | t + 4 weeks |  |
| 11 | 50 | t + 4 weeks |  |
| 12 | 75 | t + 2 weeks |  |

It can be noticed that even with electrically $SnO_2$ conductive layers having a high thickness, no cosmetic defect was observed.

d) Example 4 has been repeated except that the 99,9% pure $SnO_2$ layer was replaced with the following mixtures:

$SnO_2$ 25% $In_2O_3$ 75% $SnO_2$ 50% $In_2O_3$ 50% $SnO_2$ 75% $In_2O_3$ 25%

The results are given in the following table:

TABLE 5

| Example | $SnO_2$-$In_2O_3$ ratio | Cosmetic defect after one week |
|---|---|---|
| C11 | 25-75 | Yes |
| 13 | 50-50 | No |
| 14 | 75-25 | No |

The invention claimed is:

1. An optical article having antistatic and antireflection or reflective properties, comprising a substrate having at least one main surface coated with an antireflection or reflective coating comprising at least one electrically conductive layer, wherein:
   the electrically conductive layer comprises at least 30% tin oxide ($SnO_2$) by weight relative to the total weight of the electrically conductive layer;
   the electrically conductive layer has been deposited under ionic assistance; and
   the substrate has a water uptake rate equal to or greater than 0.6% by weight relative to total weight of the substrate.

2. The optical article of claim 1, wherein the electrically conductive layer comprises at least 40% tin oxide ($SnO_2$) by weight relative to total weight of the electrically conductive layer.

3. The optical article of claim 2, wherein the electrically conductive layer comprises at least 50% tin oxide ($SnO_2$) by weight relative to total weight of the electrically conductive layer.

4. The optical article of claim 1, wherein the thickness of the electrically conductive layer ranges from 0.1 to 150 nm.

5. The optical article of claim 4, wherein the thickness of the electrically conductive layer ranges from 1 to 20 nm.

6. The optical article of claim 1, wherein the electrically conductive layer does not contain indium.

7. The optical article of claim 1, wherein the electrically conductive layer comprises at least 90% tin oxide ($SnO_2$) by weight relative to total weight of the electrically conductive layer.

8. The optical article of claim 1, wherein the electrically conductive layer consists of a $SnO_2$ layer.

9. The optical article of claim 1, wherein the electrically conductive layer does not form an outer layer of the antireflection or reflective coating in the stack order.

10. The optical article of claim 1, wherein the electrically conductive layer forms a penultimate layer of the antireflection or reflective coating in the stack order.

11. The optical article of claim 1, wherein the substrate is made of poly(thiourethane) or results from polymerization or copolymerization of alkylene glycol bis allyl carbonates.

12. The optical article of claim 1, wherein the antireflection or reflective coating is a multilayer coating, comprising alternating high refractive index layers and low refractive index layers.

13. The optical article of claim 1, further defined as an ophthalmic lens.

14. The optical article of claim 1, wherein the antireflection or reflective coating comprises at least one layer comprising a mixture of $SiO_2$ and $Al_2O_3$, and deposition of this layer has been performed in a vacuum chamber while supplying gas into the chamber during the deposition.

15. The optical article of claim 14, wherein the pressure in the vacuum chamber during the gas supply ranges from $5.10^{-5}$ to $3.10^{-4}$ mbar.

16. A method for manufacturing the optical article of claim 1, comprising:
providing an optical article comprising a substrate having at least one main surface, the substrate having a water uptake rate equal to or greater than 0.6% by weight relative to the total weight of the substrate;
depositing under ionic assistance onto the substrate's main surface an antireflection or reflective coating, the coating comprising at least one electrically conductive layer comprising at least 30% tin oxide ($SnO_2$) by weight relative to total weight of the electrically conductive layer; and
obtaining an optical article comprising a substrate with a surface coated with the antireflection or reflective coating comprising the electrically conductive layer.

17. The method of claim 16, wherein the electrically conductive layer comprises at least 40% tin oxide ($SnO_2$) by weight relative to total weight of the electrically conductive layer.

18. The method of claim 17, wherein the electrically conductive layer comprises at least 50% tin oxide ($SnO_2$) by weight relative to total weight of the electrically conductive layer.

19. The method of claim 16, wherein the depositing comprises evaporation under vacuum.

20. The method of claim 16, wherein the optical article is substantially free of cosmetic defects.

* * * * *